(12) United States Patent
Vitantonio et al.

(10) Patent No.: US 7,357,520 B2
(45) Date of Patent: Apr. 15, 2008

(54) IMAGE PROJECTION APPARATUS

(75) Inventors: Marc L. Vitantonio, South Russell, OH (US); Trevor Jackson, Kirtland, OH (US); Dennis Futo, Strongsville, OH (US); Dale A. Panasewicz, Strongsville, OH (US); John R. Nottingham, Bratenahl, OH (US); John W. Spirk, Gates Mills, OH (US)

(73) Assignee: Emerald Innovations, LLC, Butler, PA (US)

( * ) Notice: Subject to any disclaimer, the term of this patent is extended or adjusted under 35 U.S.C. 154(b) by 0 days.

(21) Appl. No.: 11/561,268

(22) Filed: Nov. 17, 2006

(65) Prior Publication Data

US 2007/0076177 A1 Apr. 5, 2007

Related U.S. Application Data

(63) Continuation of application No. 10/605,210, filed on Sep. 15, 2003, now Pat. No. 7,182,472, and a continuation-in-part of application No. 10/008,112, filed on Oct. 22, 2001, now Pat. No. 6,695,452.

(60) Provisional application No. 60/425,455, filed on Nov. 12, 2002, provisional application No. 60/410,855, filed on Sep. 13, 2002, provisional application No. 60/242,309, filed on Oct. 20, 2000.

(51) Int. Cl.
*G03B 21/14* (2006.01)

(52) U.S. Cl. .................................... 353/119

(58) Field of Classification Search ................ 353/39, 353/42, 43, 110, 119, 100
See application file for complete search history.

(56) References Cited

U.S. PATENT DOCUMENTS

| | | | |
|---|---|---|---|
| 1,747,556 A | 2/1930 | Price |
| 1,885,841 A | 11/1932 | Krupnik |
| 2,170,368 A | 8/1939 | Gentilini |
| 2,445,651 A | 7/1948 | Weavie |
| 2,630,642 A | 3/1953 | Mast et al. |
| 2,699,621 A | 1/1955 | Levinson |
| 2,811,892 A | 11/1957 | Holloway |
| 3,072,015 A | 1/1963 | Thannhauser |
| D201,528 S | 6/1965 | Nemeth |
| 3,366,006 A | 1/1968 | Saila |
| D211,803 S | 7/1968 | Genin |
| 3,409,353 A | 11/1968 | Zillmer |
| 3,431,409 A | 3/1969 | Richter, III et al. |
| 3,756,710 A | 9/1973 | Taylor |
| 3,767,299 A | 10/1973 | Fisher |
| D231,489 S | 4/1974 | Uitz et al. |
| D234,837 S | 4/1975 | Olson |
| 3,897,144 A | 7/1975 | Hicks |
| 4,097,136 A | 6/1978 | Astarloa |
| 4,171,882 A | 10/1979 | Johnson, III et al. |
| 4,214,296 A | 7/1980 | Magett |
| 4,250,537 A | 2/1981 | Roegner et al. |

(Continued)

*Primary Examiner*—William C. Dowling

(57) ABSTRACT

A projector comprising a directional light source, a lens disposed opposite the light source, and an image medium support assembly disposed between the light source and the lens along a light path that extends from the light source through the lens; a housing enclosing the directional light source, the image medium support assembly, and the lens, wherein said housing is suitable for outdoor use; and a support member connected to the housing such that the angle of projection can be adjusted.

14 Claims, 23 Drawing Sheets

U.S. PATENT DOCUMENTS

| | | |
|---|---|---|
| 4,307,528 A | 12/1981 | Dewees et al. |
| 4,557,055 A | 12/1985 | Arai |
| 4,756,614 A | 7/1988 | Kato et al. |
| 4,764,850 A | 8/1988 | Albanese |
| 4,779,176 A | 10/1988 | Bornhorst |
| 4,902,117 A | 2/1990 | Papp |
| 4,972,305 A | 11/1990 | Blackburn |
| 5,170,196 A | 12/1992 | Itoh |
| 5,191,368 A | 3/1993 | Kalua et al. |
| 5,233,375 A | 8/1993 | Williams et al. |
| 5,272,604 A | 12/1993 | Lin |
| 5,311,226 A | 5/1994 | Karasawa |
| 5,311,348 A | 5/1994 | Yamakawa |
| 5,321,449 A | 6/1994 | Coccoli et al. |
| 5,357,289 A | 10/1994 | Konno et al. |
| 5,367,349 A | 11/1994 | Zeiler |
| 5,374,969 A | 12/1994 | Kyhl et al. |
| 5,459,539 A | 10/1995 | Yamamoto |
| 5,463,433 A | 10/1995 | Koo |
| 5,517,264 A | 5/1996 | Sutton |
| 5,580,143 A | 12/1996 | Behr |
| 5,613,799 A | 3/1997 | Guide |
| 5,663,762 A | 9/1997 | Nishiyama |
| 5,769,684 A | 6/1998 | Lou |
| 5,803,564 A | 9/1998 | Bruinsma et al. |
| 5,951,137 A | 9/1999 | Bortz |
| 5,978,051 A | 11/1999 | Gohman et al. |
| 5,980,045 A | 11/1999 | Fujibayashi |
| 6,000,813 A * | 12/1999 | Krietzman ................... 362/259 |
| 6,012,815 A | 1/2000 | Bruinsma et al. |
| 6,053,615 A | 4/2000 | Peterson et al. |
| 6,145,228 A | 11/2000 | LaChance |
| 6,227,672 B1 | 5/2001 | Bortz |
| 6,283,600 B1 | 9/2001 | Levasseur |
| 6,481,853 B2 | 11/2002 | Meng-Suen |
| 6,505,940 B1 * | 1/2003 | Gotham et al. ............. 353/119 |
| 6,508,554 B2 | 1/2003 | Hatakeyama et al. |
| 6,695,452 B2 | 2/2004 | Panasewicz et al. |
| 6,702,445 B1 | 3/2004 | Meng-Suen |
| 6,793,355 B1 | 9/2004 | Leung |
| 7,182,472 B2 | 2/2007 | Vitantonio et al. |
| 2002/0101571 A1 | 8/2002 | Panasewicz et al. |
| 2004/0119951 A1 | 6/2004 | Vitantonio et al. |
| 2004/0125348 A1 | 7/2004 | Carkner |
| 2006/0256291 A1 | 11/2006 | Vitantonio et al. |

* cited by examiner

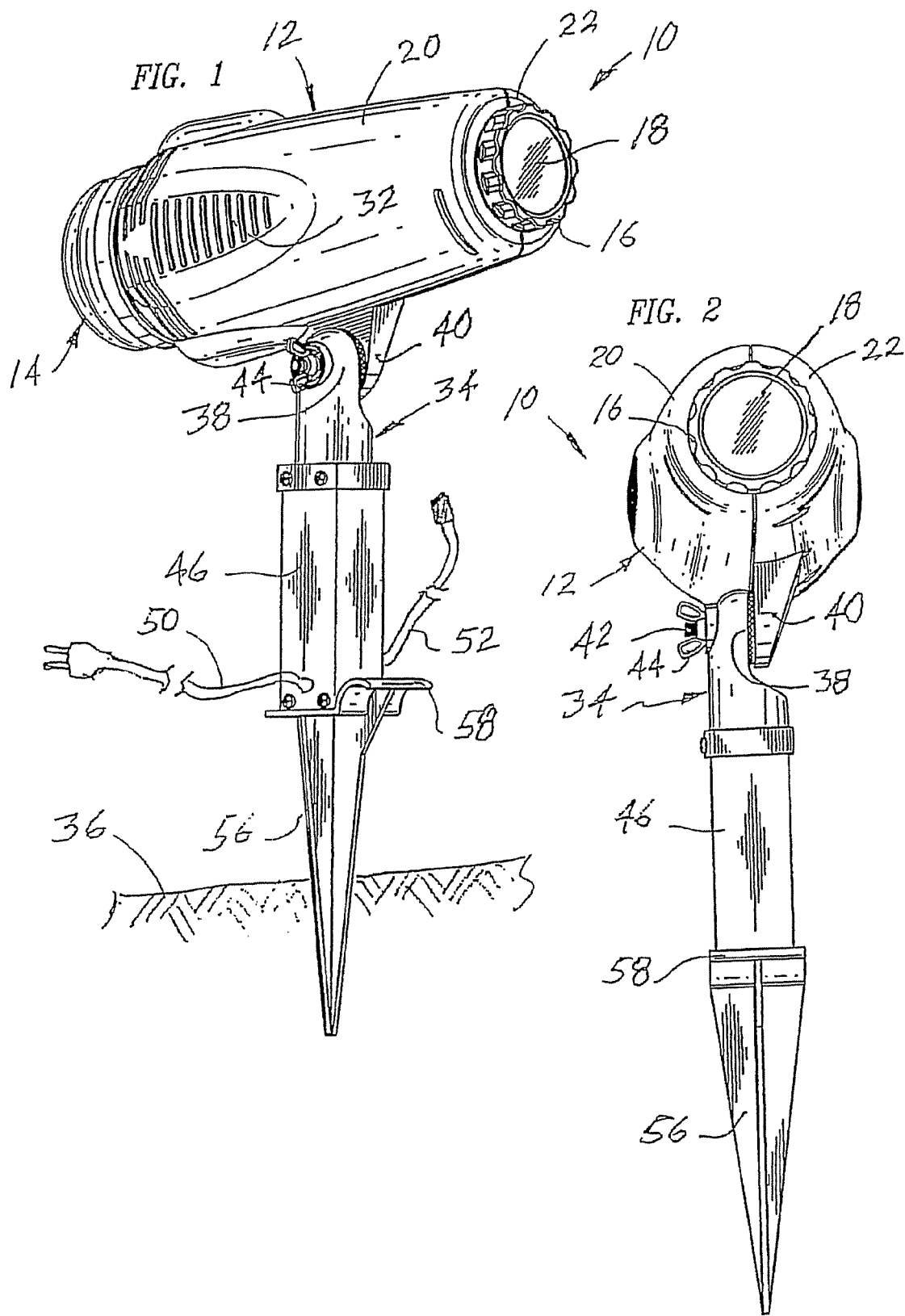

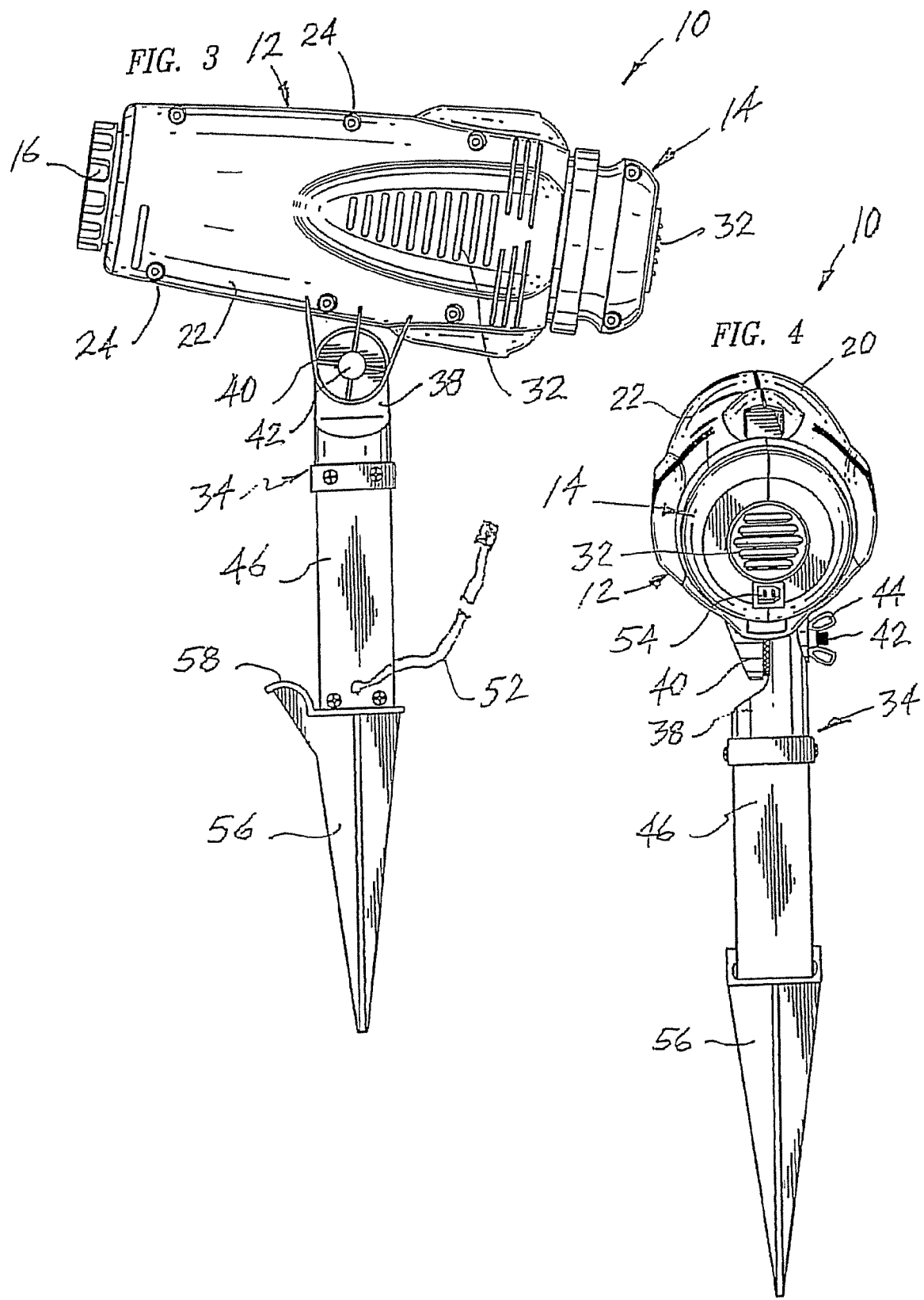

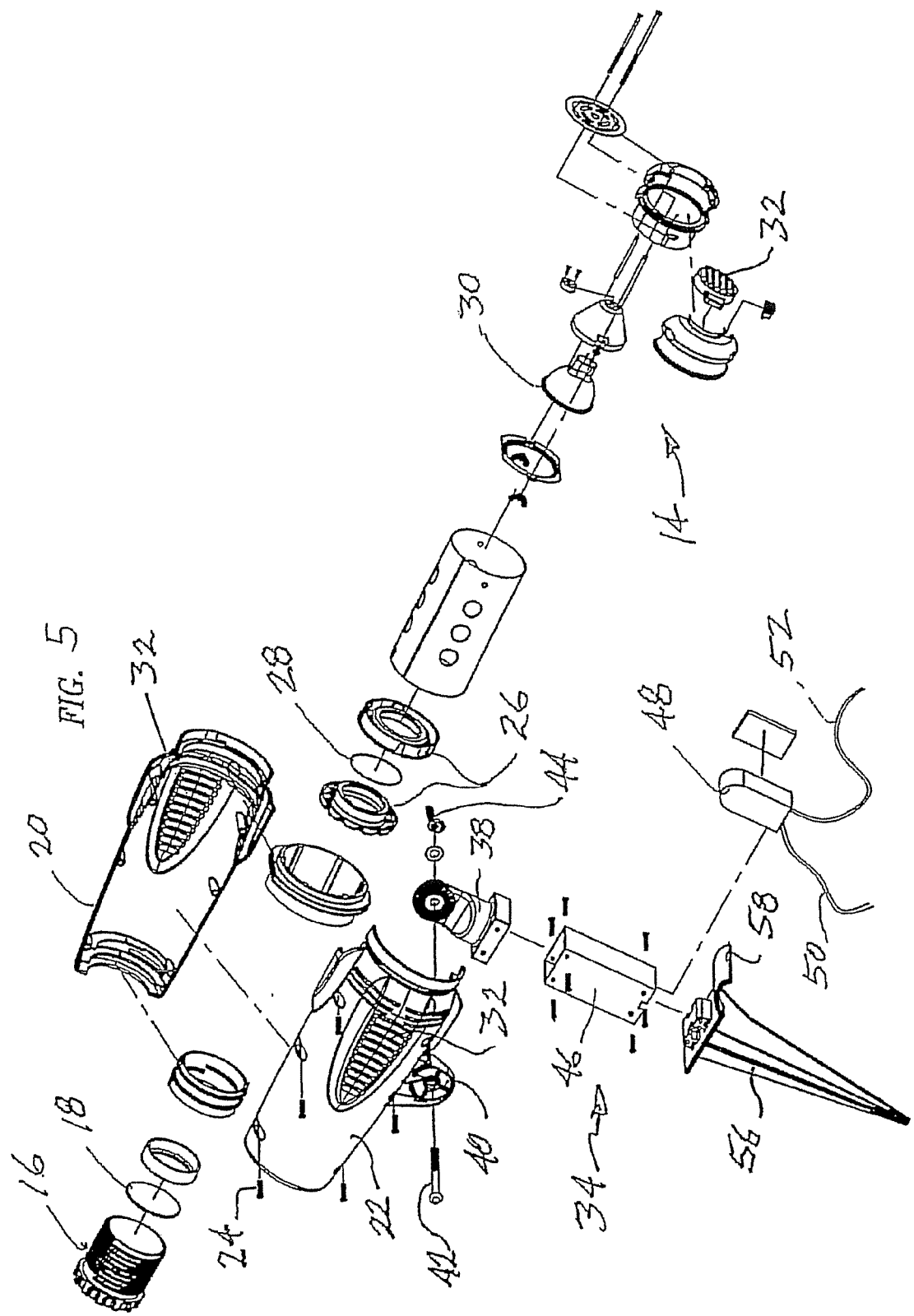

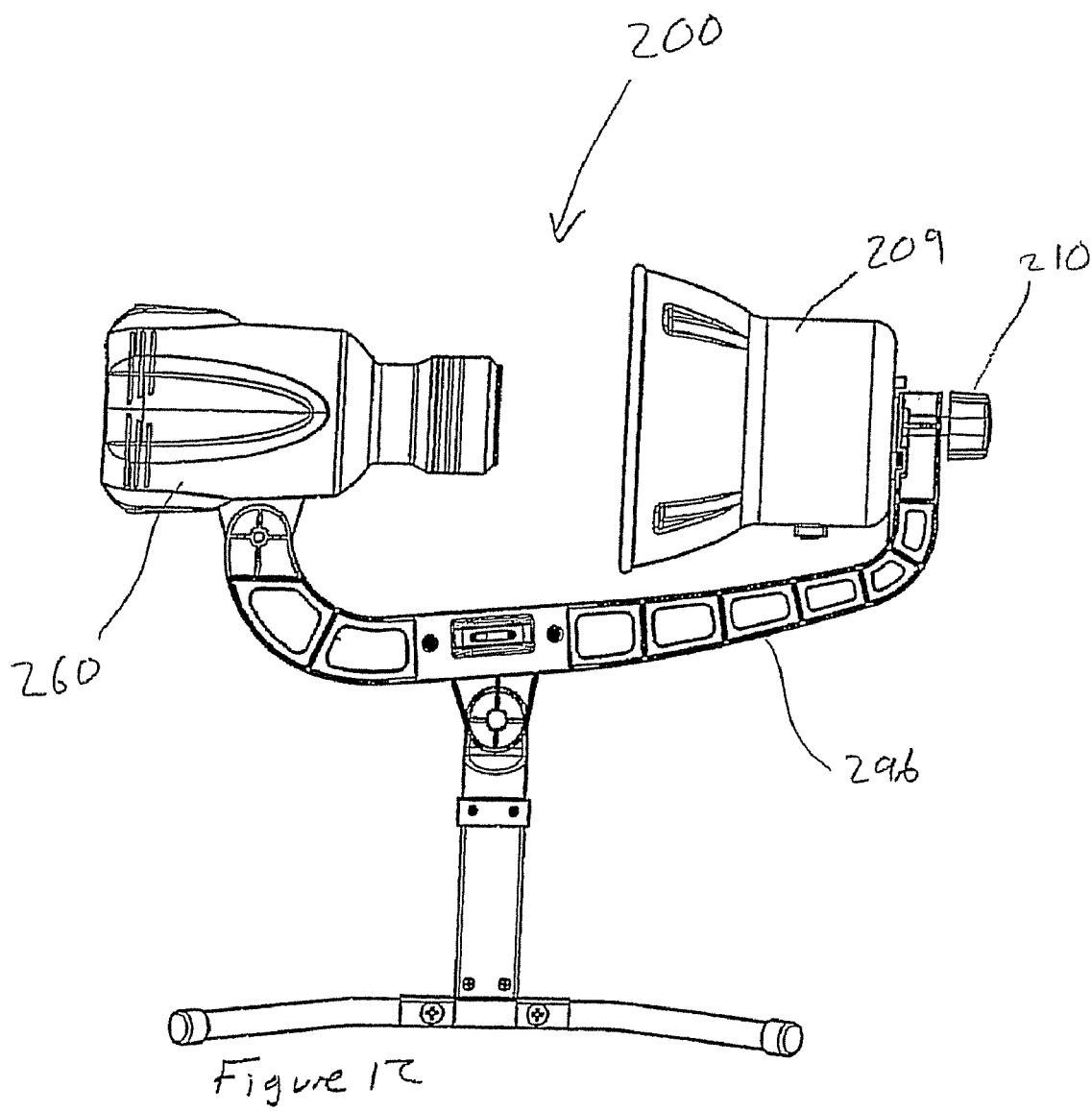
Figure 1τ

270

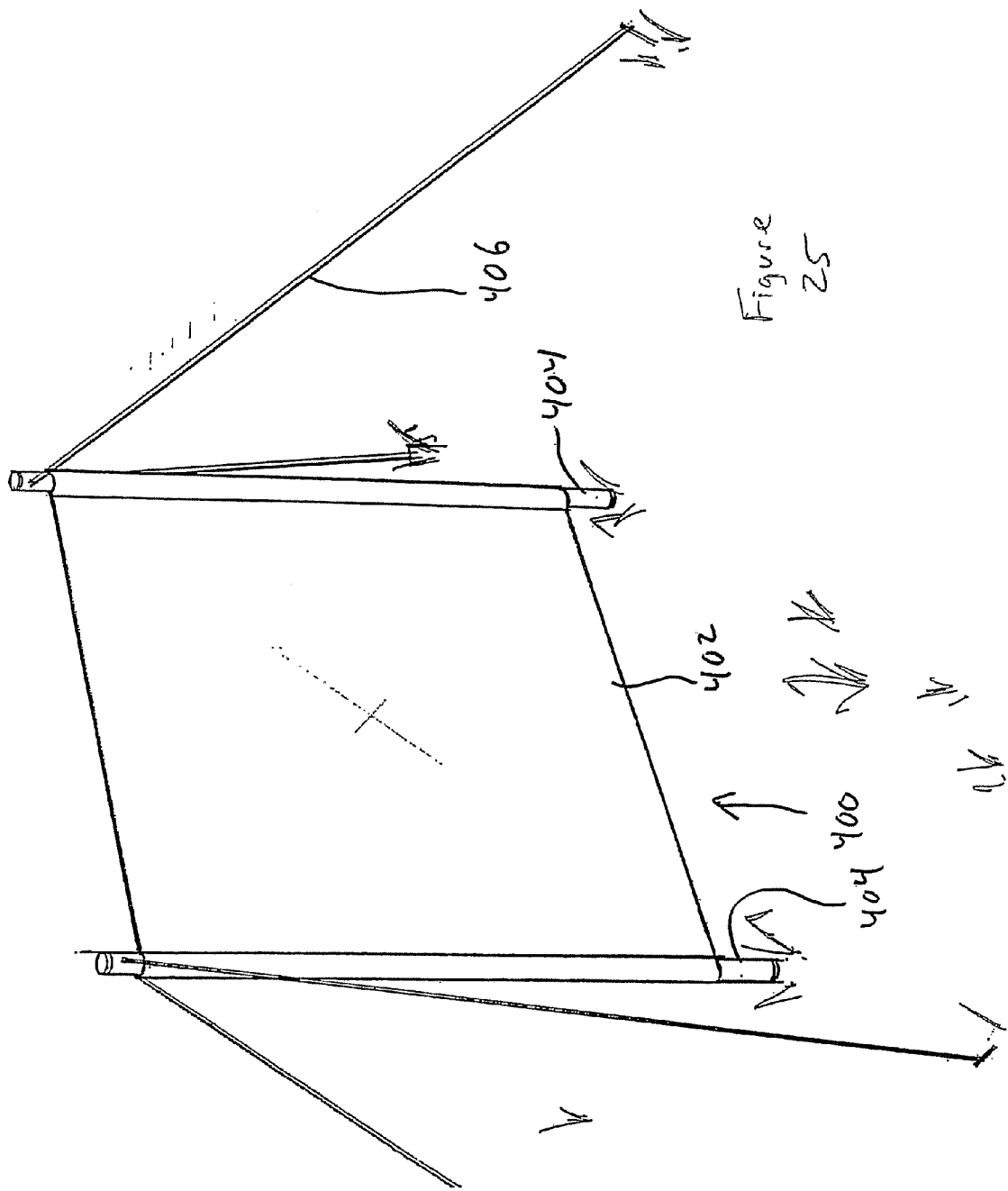

IMAGE PROJECTION APPARATUS

CLAIM OF PRIORITY

This application is a continuation of U.S. patent application Ser. No. 10/605,210, filed on Sep. 15, 2003, now U.S. Pat. No. 7,182,472 which claims the benefit of U.S. provisional patent application Ser. No. 60/410,855, filed Sep. 13, 2002 and U.S. provisional patent application Ser. No. 60/425,455, filed Nov. 12, 2002; U.S. patent application Ser. No. 10/605,210 is a continuation-in-part of U.S. application Ser. No. 10/008,112, now U.S. Pat. No. 6,695,452, filed Oct. 22, 2001, which claims the benefit of U.S. provisional patent application Ser. No. 60/242,309, filed Oct. 20, 2000.

BACKGROUND OF THE INVENTION

This invention relates to devices used to project images embodied on transparent polymeric film onto one or more viewing surfaces by shining a light through the image embodied on the film. More particularly, the invention relates to projectors used to project thematic images singly, in either a static or serial display, onto a viewing surface or to project multiple views of an image simultaneously onto a plurality of viewing surfaces.

The projection of images using light is a well known and popular way to decorate or entertain, especially during the holidays, seasonal events or special occasions. One can display images associated with the occasion (e.g. a ghost for Halloween), and a projected image displayed under low light conditions can make a lasting impression on an observer. A relatively small image can be enlarged to many times its original size and displayed upon a surface such as a wall, garage door, sheet, screen or the like. Drawbacks to the practice of projecting images using light include the high cost of conventional projectors, many of which cannot be used outdoors in inclement weather, and the fact that such projectors typically require some intervention by the user in order to change the image being projected. Projectors are therefore needed that are economical to manufacture and use, that can be used outdoors without risk of injury or damage, and that can display images singly, serially, or simultaneously on multiple surfaces without user intervention.

BRIEF DESCRIPTION OF THE DRAWINGS

The apparatus of the invention is further described and explained in relation to the following figures of the drawings wherein:

FIG. 1 is a front perspective view of a preferred projector of the invention;

FIG. 2 is a right side elevation view of the projector of FIG. 1;

FIG. 3 is a rear elevation view of the projector of FIG. 1;

FIG. 4 is a left side elevation view of the projector of FIG. 1;

FIG. 5 is an exploded perspective view of the projector of FIG. 1;

FIG. 12 is a side view of an assembled version of the alternate embodiment of FIG. 9.

FIG. 25 is a perspective view of a screen upon which images may be displayed.

DESCRIPTION OF THE PREFERRED EMBODIMENTS

Figure 6:
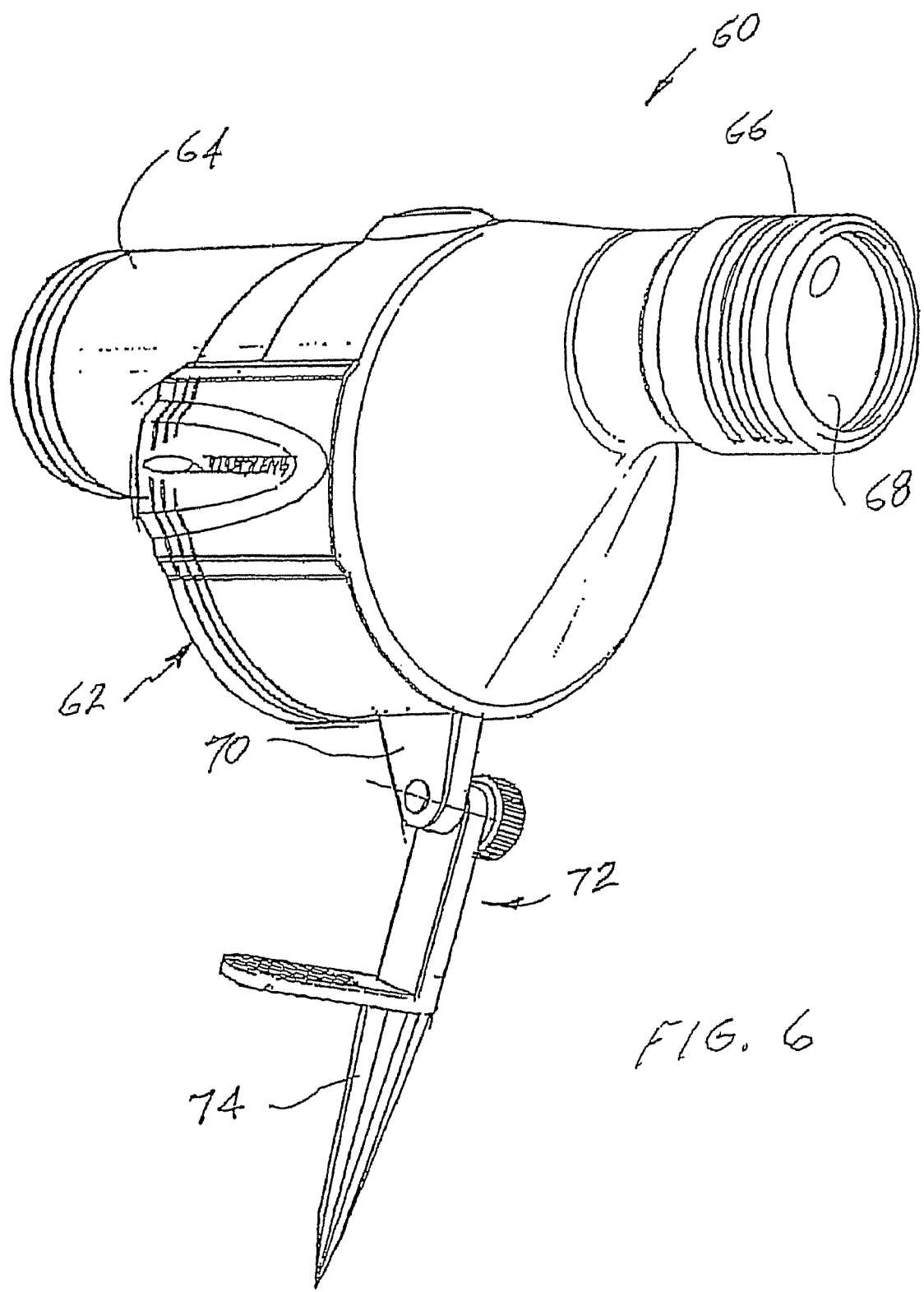
FIG. 6 is a front perspective view of another preferred projector of the invention that is modified to rotate an image wheel through the light path.

Referring to FIGS. 1-6, projector 10 preferably comprises a polymeric housing 12 supporting a light source 14 at one end and a lens tube 16, most preferably containing a biconvex lens 18, at the other. Housing 12 is preferably injection molded from an impact resistant polymer and is most preferably molded in two halves 20 and 22 that are joined during assembly with screws 24 or other similarly effective fasteners The imaginary line between light source 14 and lens 18 establishes a light path that, when extended beyond projector 10, continues to a viewing surface upon which an image is to be projected Housing 12 preferably further comprises an image medium support assembly 26 that is disposed between light source 14 and lens 18. Image medium support assembly 26 supports an image medium 28 such as, for example, a circular disk comprising a slide film or transparency in an image window through which light emanating from light source 14 is directed toward lens 18. Lens tube 16 is most preferably threaded into engagement with housing 12 in such manner that the focal length between image medium 28 and lens 18 can be adjusted within predetermined limits. Light source 14 preferably contains an electric lamp 30 and is threaded into engagement with the end of housing opposite lens tube 16, When removed, light source 14 also provides access to image medium support assembly 26 so that image medium 28 can be changed as desired. Vents or louvers 32 are desirably provided in housing 12 and in light source 14 to facilitate convective cooling of lamp 30 during use.

Projector 10 preferably further comprises a projector support member 34 to which housing 12 is connected in such manner that the angle of the light path relative to an underlying support surface can be adjusted easily by the user. According to one embodiment of the invention, the connecting mechanism comprises opposed engagement members 38, 40 having interlocking teeth and coaxially aligned apertures through which a threaded bolt 42 can be inserted and tightened using wing nut 44 when projector housing 12 is in the preferred angular position. Projector support member 34 preferably further comprises a tubular member 46 containing a transformer 48 that desirably converts standard household electrical current to a lower voltage for use with lamp 30 of projector 10, One electrical conductor 50 supplies electrical current to transformer 48 and another electrical conductor 52 supplies the converted current to plug 54 on the back of light source 14 of housing 12. Projector support member 34 preferably further comprises mounting stake 56 having footrest 58 to facilitate insertion of mounting stake 56 into the ground for outdoor use on earthen surface 36, Although projector support member 34 is described above in relation to a preferred embodiment intended for use with an earthen support surface 36, it will be apparent to those of ordinary skill in the art upon reading this disclosure that projector support members having other physical configurations can likewise be provided for use with other underlying support surfaces for projector 10.

Figure 7:
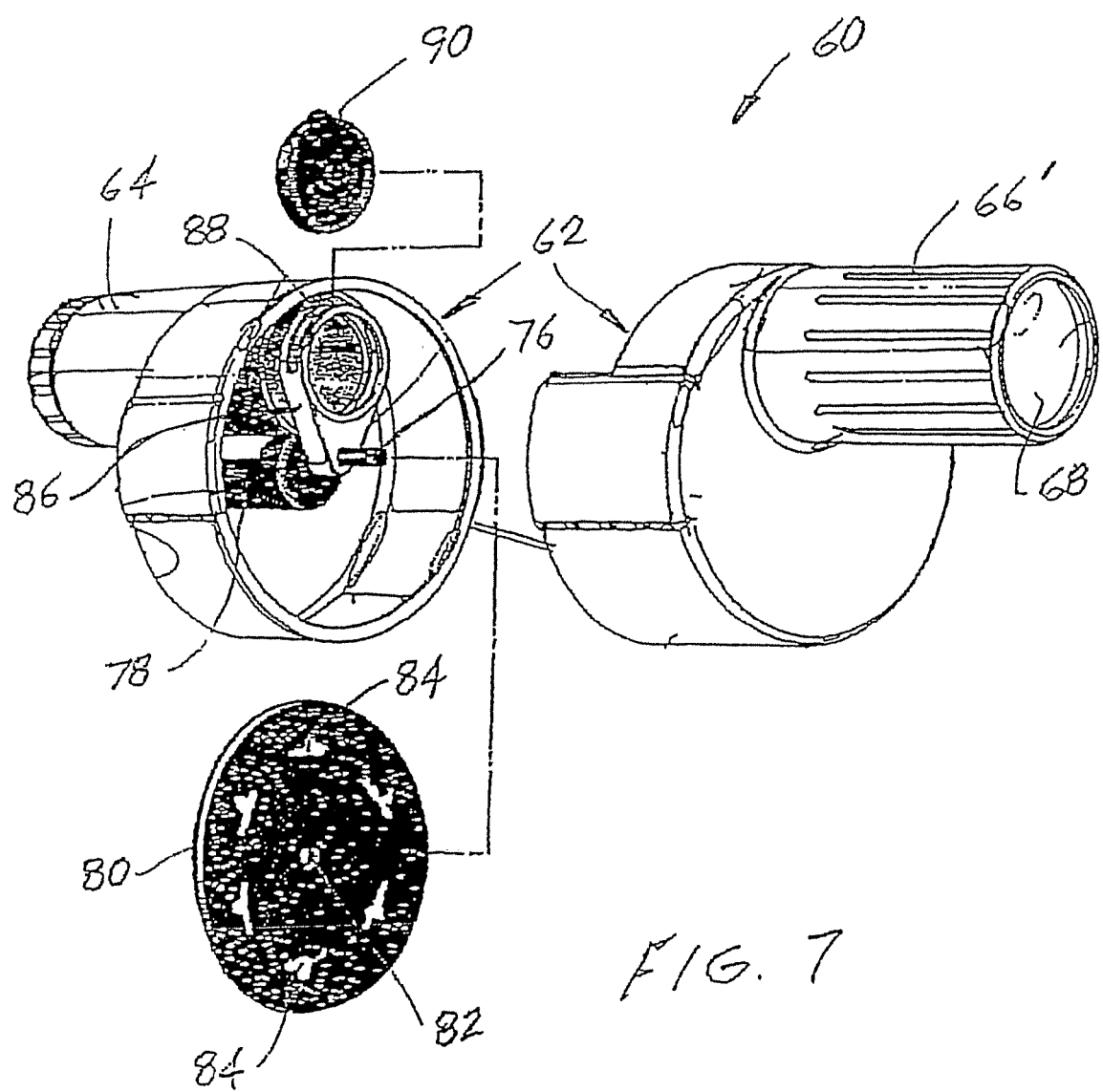
FIG. 7 is a partial exploded view of the projector of FIG. 6.

According to another embodiment of the invention, described herein in relation to FIGS. 6 and 7, a projector is disclosed that is substantially as described above but modified to serially advance different images into the light path without user intervention. A preferred modification for achieving this function this the provision of a small electric motor inside the housing with a rotating shaft that causes a wheel comprising multiple fixed images to rotate the same or different images sequentially through the light path of the projector. This rotation can be accomplished continuously or intermittently by the provision of appropriate conventional linkage and control mechanisms well known to those of skill in the art. Referring to FIG. 6, projector 60 preferably comprises an enlarged molded plastic housing 62, again having a light source 64 disposed at one end and a lens tube 66 containing lens 68 at the other, thereby defining a light path through the projector. Projector 60 is preferably attached by mounting stud 70 to support member 72, which is shown as having a stake 74 for insertion into an earthen surface for outdoor use. Electrical power cords and a transformer as previously described for projector 10 are also desirably utilized with this embodiment of the invention but are not depicted in the simplified drawing of FIG. 6.

The internal structure and operation of projector 60 are better described and explained in relation to FIG. 7, in which the parts are intended to be substantially identical to those depicted in FIG. 6, except that a differently shaped lens tube 66' is disclosed, and the mounting stud and support member are not shown to simplify the illustration. Also, because FIGS. 6 and 7 are simplified diagrammatic views, screws used to assemble the halves of body 62 and other structural details are not shown in these figures Referring to FIG. 7, housing 62 of projector 60 preferably comprises an electric motor 78 that rotates shaft 76, which is offset from the light path established by light source 64 and lens 68. Image medium support assembly 86 comprising image window 88 cooperates with rotatable shaft 76 to rotate image wheel 80. Image wheel 80 further comprises a centrally disposed aperture 82 that engages shaft 76 so that image wheel 80 is rotated through image window 88 whenever motor 78 is energized. Electrical cords, transformers and plugs are also not shown to simplify the illustration but can be provided as for projector 10 as previously described. Image wheel 80 preferably comprises a plurality of images 84 that are arcuately spaced apart near its periphery to facilitate the serial advancement of such images into image window 88 as wheel 80 rotates. Images 84 can be the same or different. Cartridge 90 is also desirably provided so that a single image or color filter can be installed inside image medium support assembly 86 in place of, or in addition to, using image wheel 80 if desired.

Figure 8:
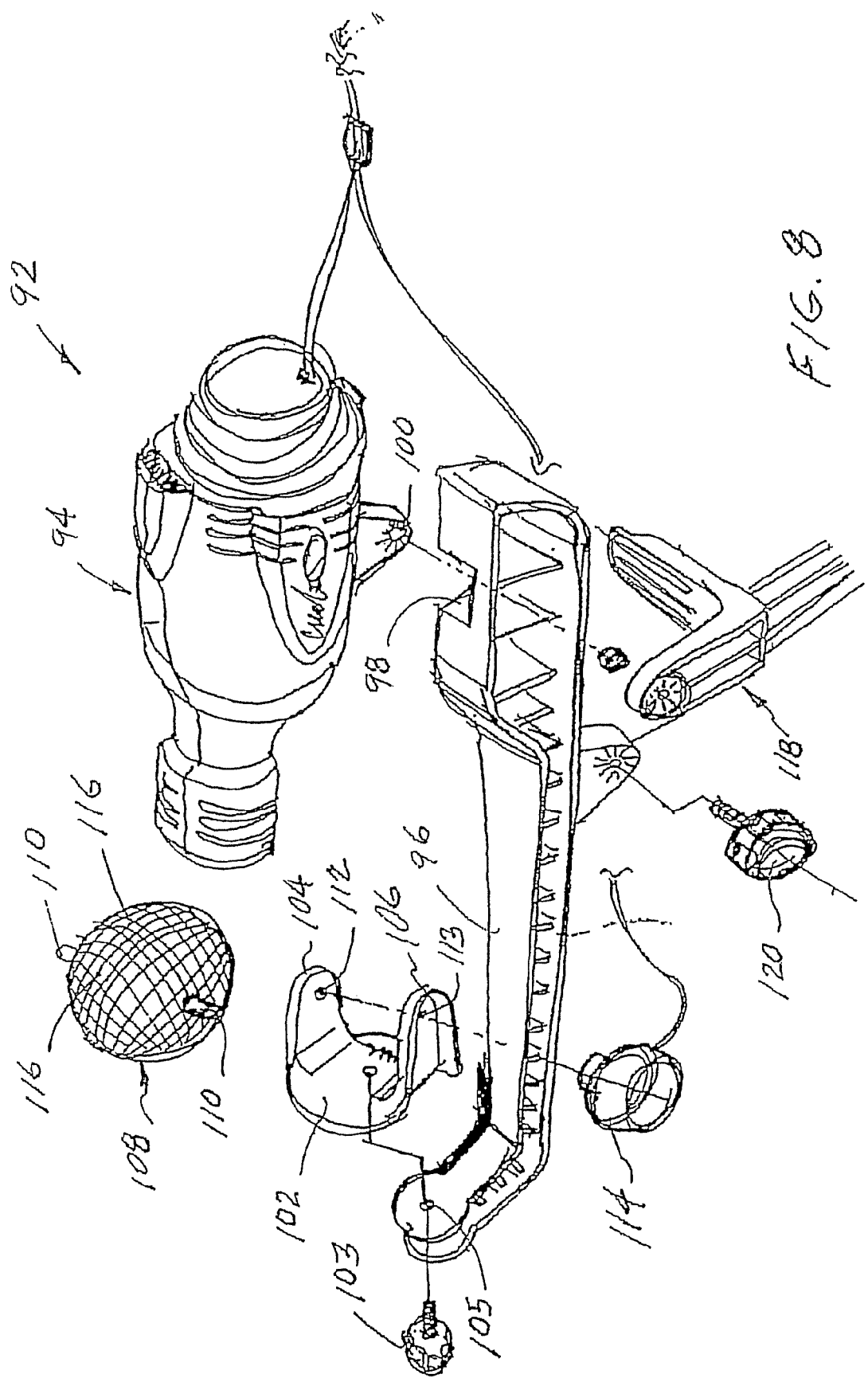
FIG. 8 is an exploded perspective view, partially broken away, of another preferred projector assembly of the invention wherein a mirror ball is rotatably mounted in the light path emanating from the projector.

According to another embodiment of the invention, a projector assembly is disclosed that comprises a low cost projector substantially as described above but modified to simultaneously project a single image in a plurality of directions after the projected light beam exits the projector housing. This embodiment of the invention utilizes a frame assembly that aligns the projector with a rotating mirror ball that simultaneously redirects the projected image in many different directions and continuously changes the image being projected onto a particular spot on surrounding viewing surfaces. This embodiment of the invention is particularly preferred for indoor use where the image can be directed against both walls and ceiling at the same time Referring to FIG. 8, an exploded view is shown of a projector assembly 92 comprising projector 94, which can be mounted in fixed relation to support frame 96. Support frame 96 can in turn be adjustably mounted to support member 118 using bolt 120 to vary the inclination of frame 96 as desired, Frame member 96 preferably further comprises, in spaced apart relation to projector 94, a mounting bracket 102 secured to frame 96 by bolt 103 inserted through aperture 106, or by any other similarly effective means or mechanism. A multi-faceted reflective element such as mirror ball 108 is preferably supported on an axle 110 that is rotatably mounted in clevis members 104, 106 through apertures 112, 113 in such manner that axle 110 can be rotated by electric motor to slowly turn mirror ball 108. Mirror ball 108 preferably comprises a plurality of small mirrored surfaces 116 oriented in many different directions. The lighting effect achieved through the use of projector 94 in this manner under conditions of low ambient light is to simultaneously direct the projected image against many viewing surfaces, seemingly multiplying the projected image many times over. When mirror ball 108 is rotated, the effect is further enhanced by imparting motion to the multiple projected images.

Figure 9:
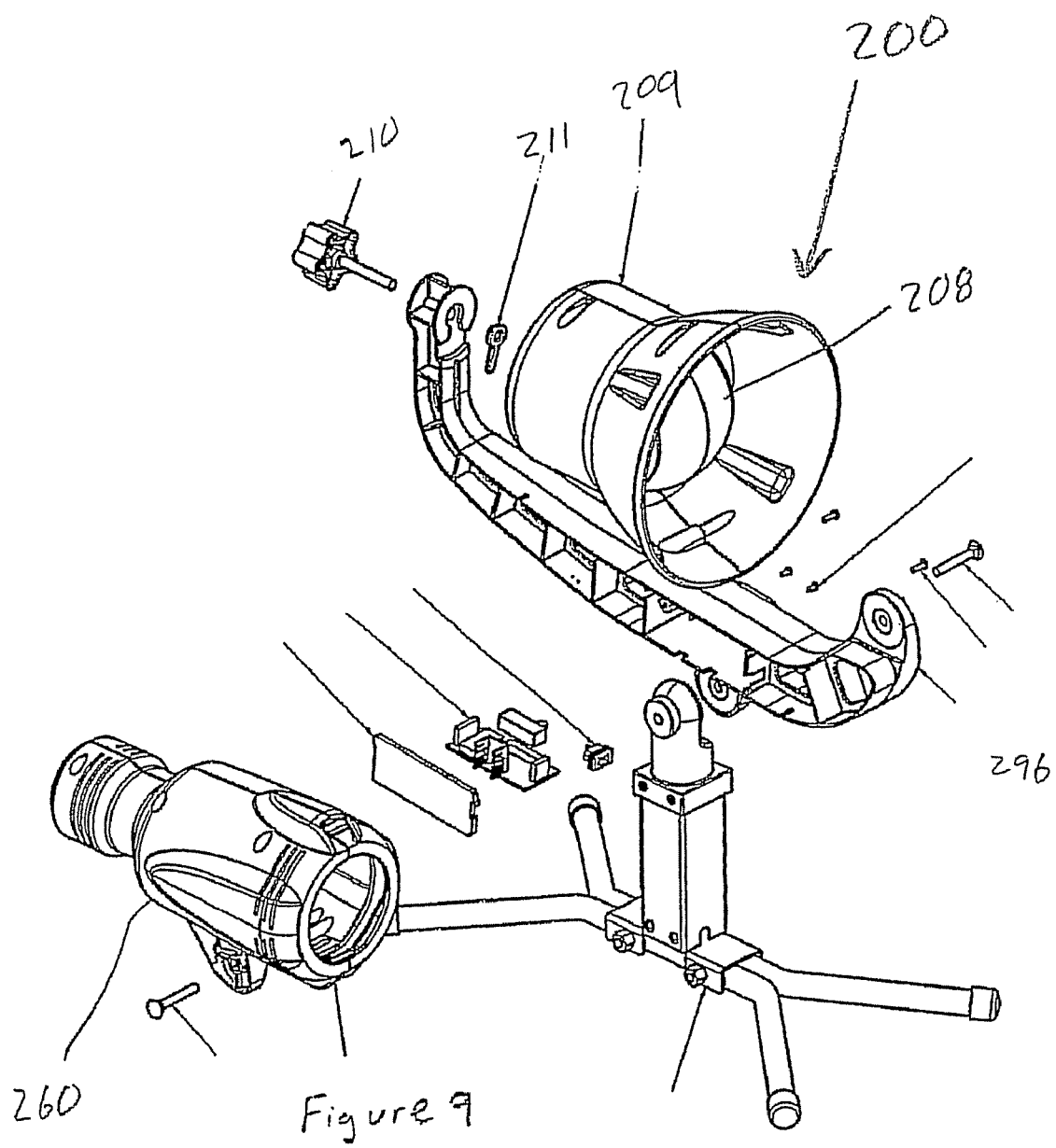
FIG. 9 is an exploded view of an alternate embodiment of the projector assembly including the mirror ball.

FIGS. 9 and 12 show an alternate embodiment of the projector 200 which includes a reflector element 208 which is shielded and rotated from its interior. The projector 260 may be supported upon frame member 296. Additionally, the reflective element 208 may be indirectly supported by the frame member 296. The reflective element 208 may be supported by a shield 209 which is in turn supported by the frame member 296. An easy-to-loosen nut 210 is used to attach the shield 209 to the frame member 296 such that the shield 209 and reflective element 208 may be easily rotated to new positions. A key 211 may be included which restricts the shield 209 and reflective element 208 from being rotated in multiple three-hundred and sixty degree circuits in a single direction. As a result the entanglement of an electrical cord between the transformer and reflective element is avoided.

Figure 11A:
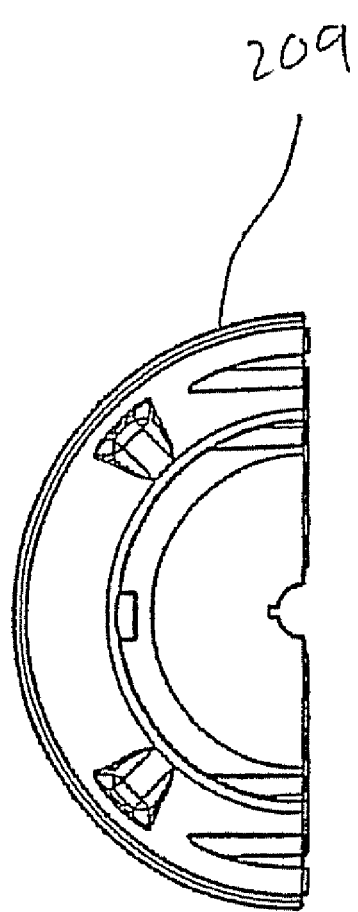
FIG. 11a is a front view of one section of a shield of the alternate embodiment of FIG. 9.
Figure 11B:
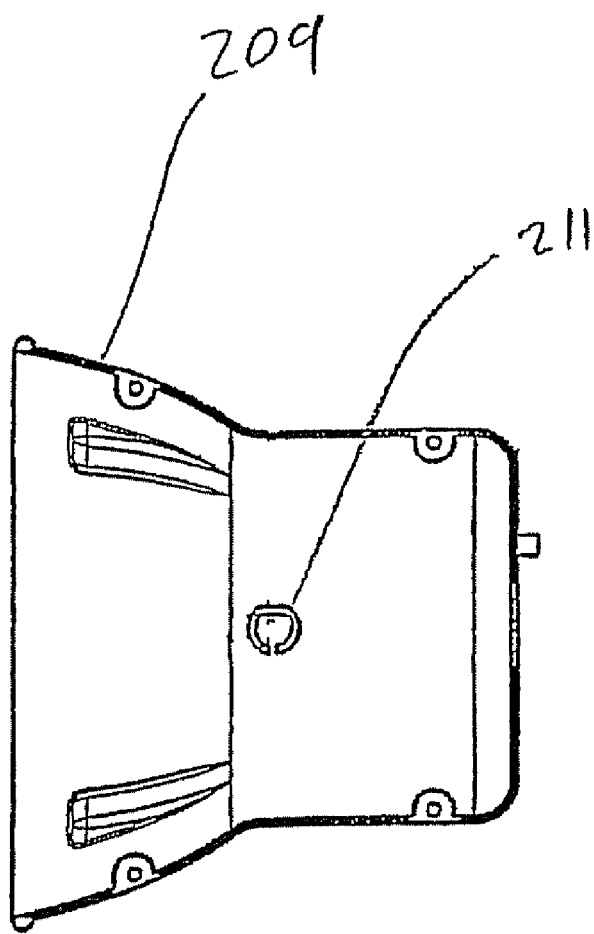
FIG. 11b is a side view of one section of a shield of the alternate embodiment of FIG. 9.
Figure 13:
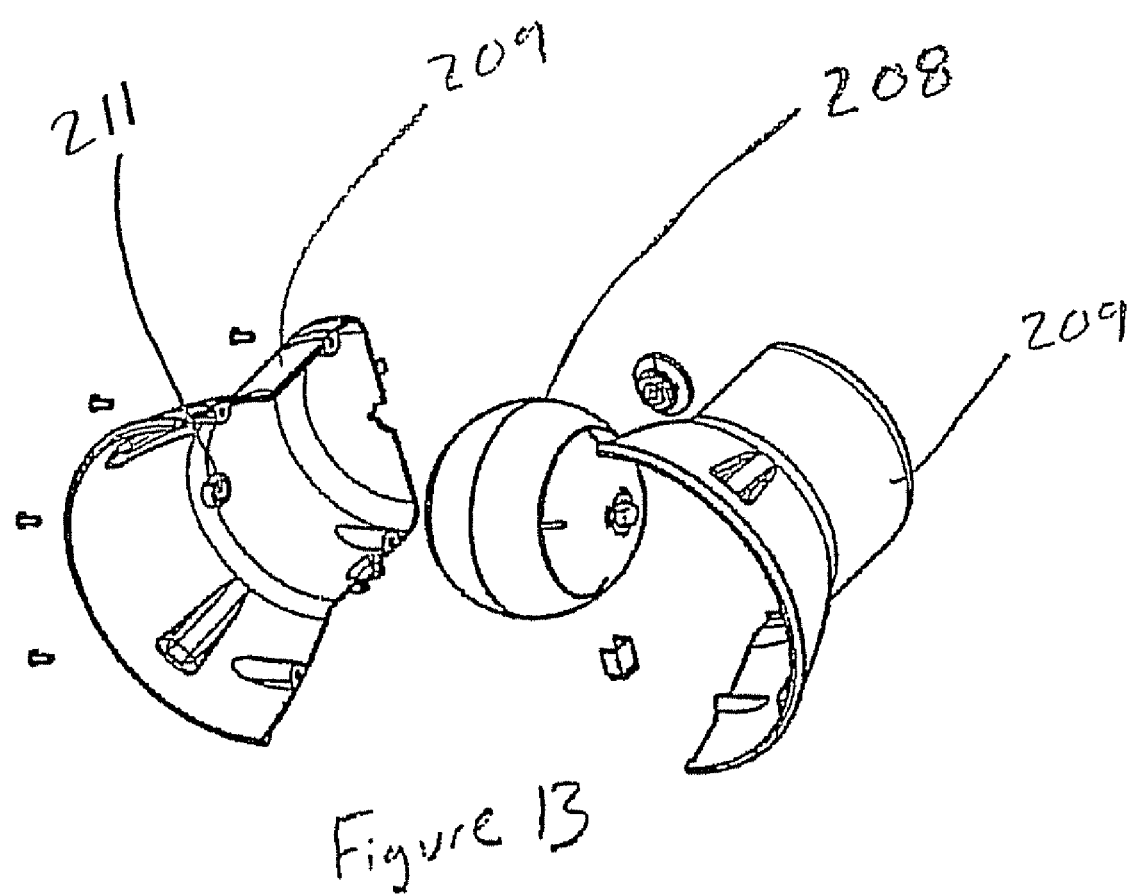
FIG. 13 is an exploded view of a mirror ball and shield assembly.
Figure 14:
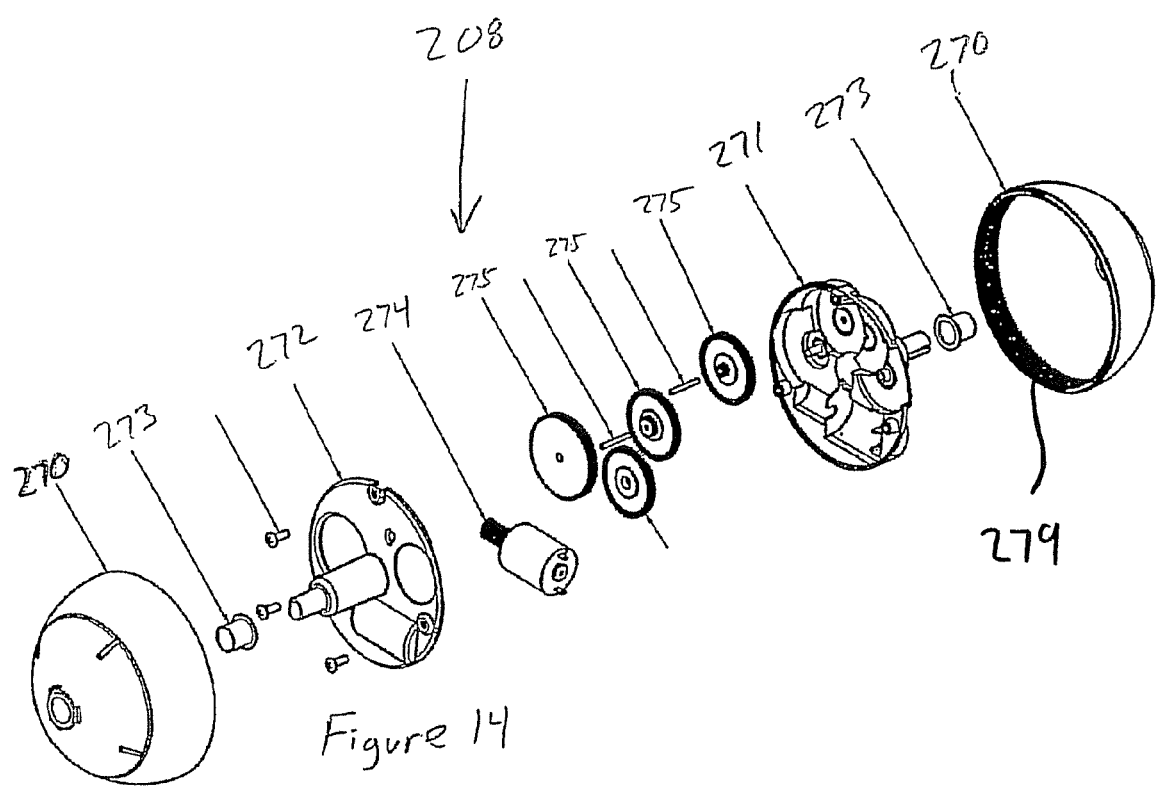
FIG. 14 is an exploded view of a mirror ball.
Figure 15:
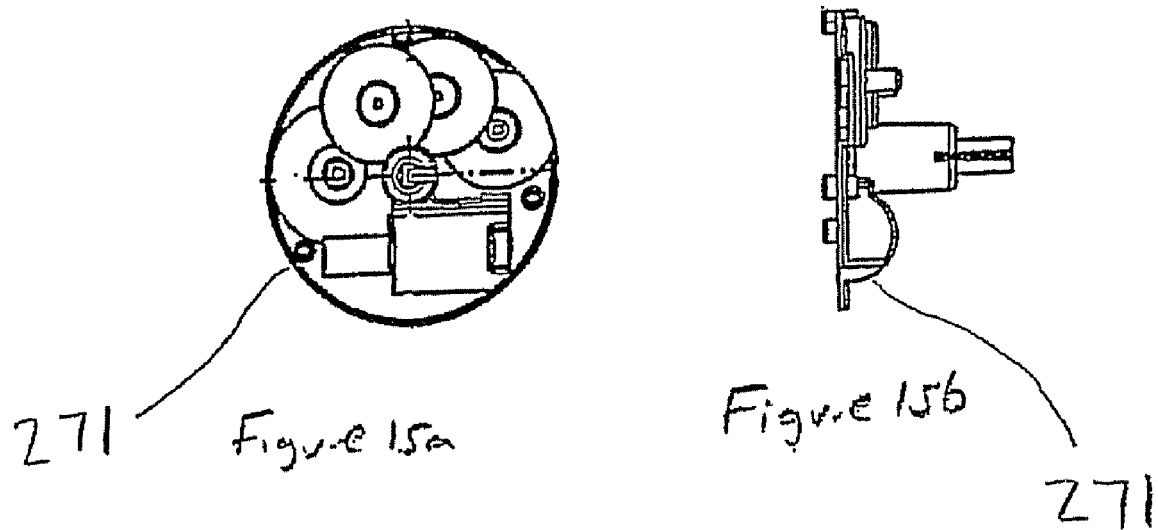
FIG. 15a is a front view of components of the mirror ball.
FIG. 15b is a side view of components of the mirror ball.
Figure 16:
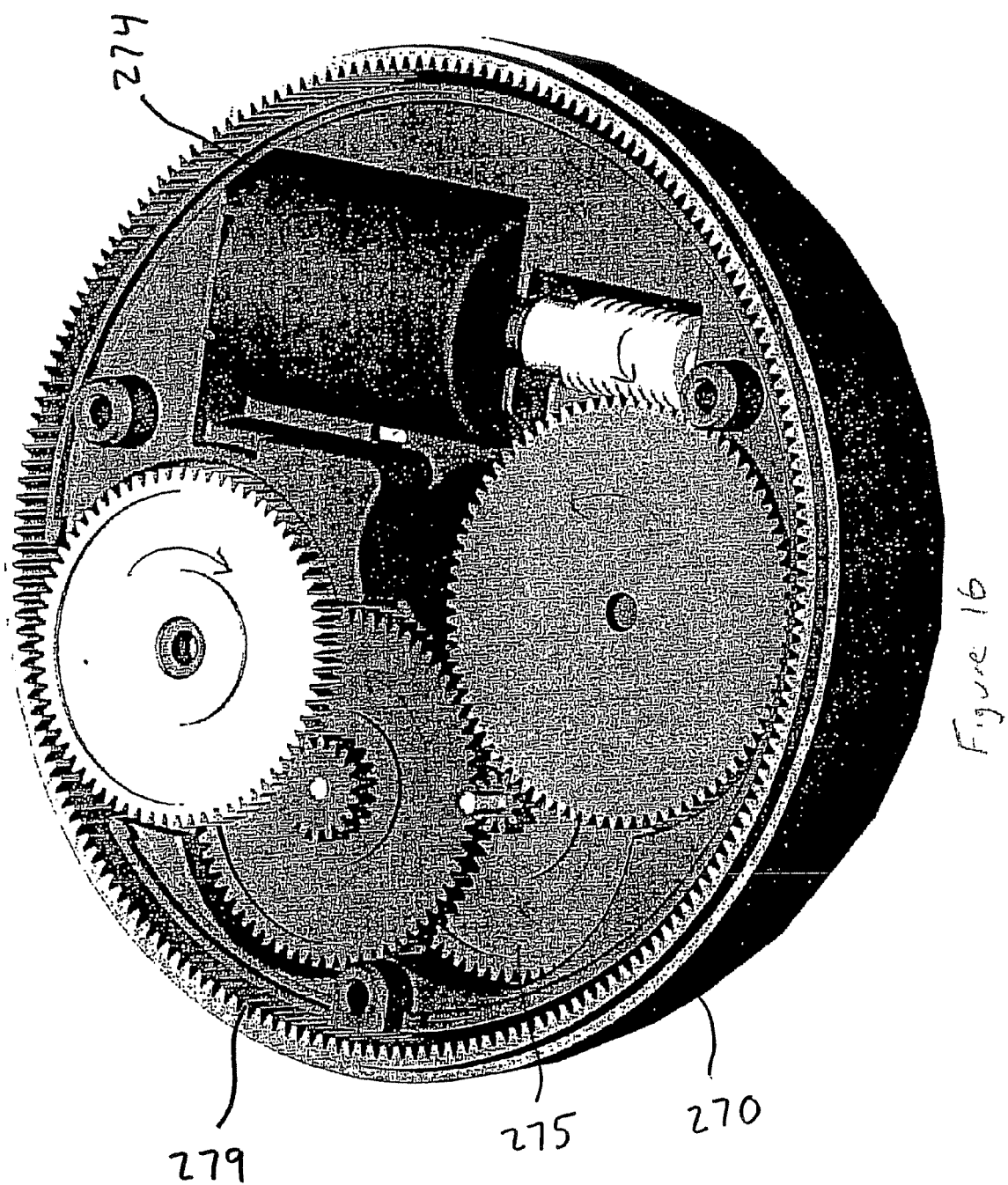
FIG. 16 is a perspective view of the mirror ball with gear rotation indicators.
Figure 17B:
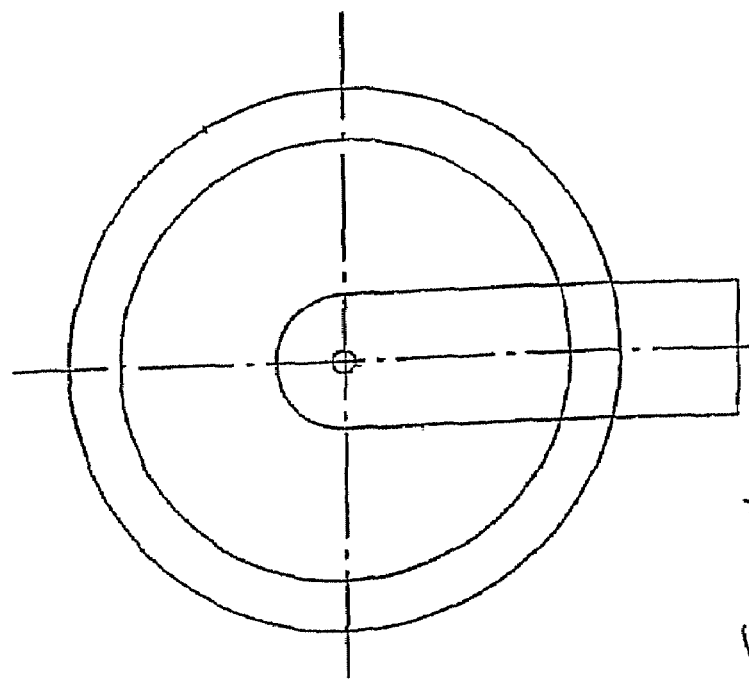
FIG. 17b is a side view of a barrel shaped configuration of the mirror ball.
Figure 17A:
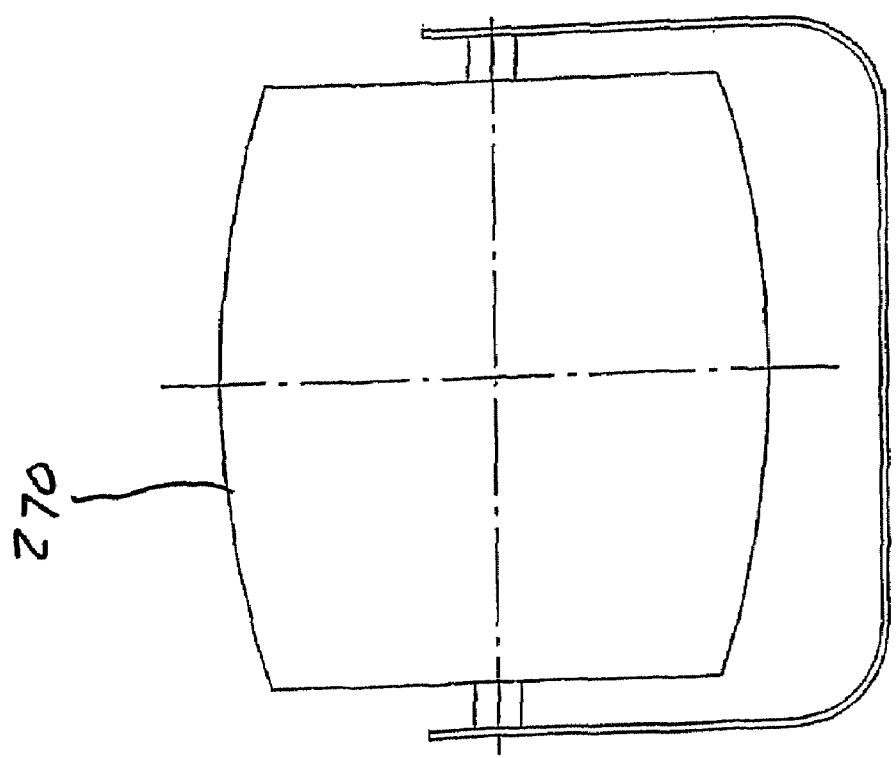
FIG. 17a is a front view of a barrel shaped configuration of the mirror ball.

Referring to FIGS. 11a, 11b and 13 the shield 209 may be fabricated in two portions capable of being joined together. The shield 209 may include a support aperture or indentation 211 which may support the reflective element 208. The shield 209 functions as a support device, and also blocks some of the light reflected off of the reflective element 208 which was reflected off in an undesired direction.

Figure 10:
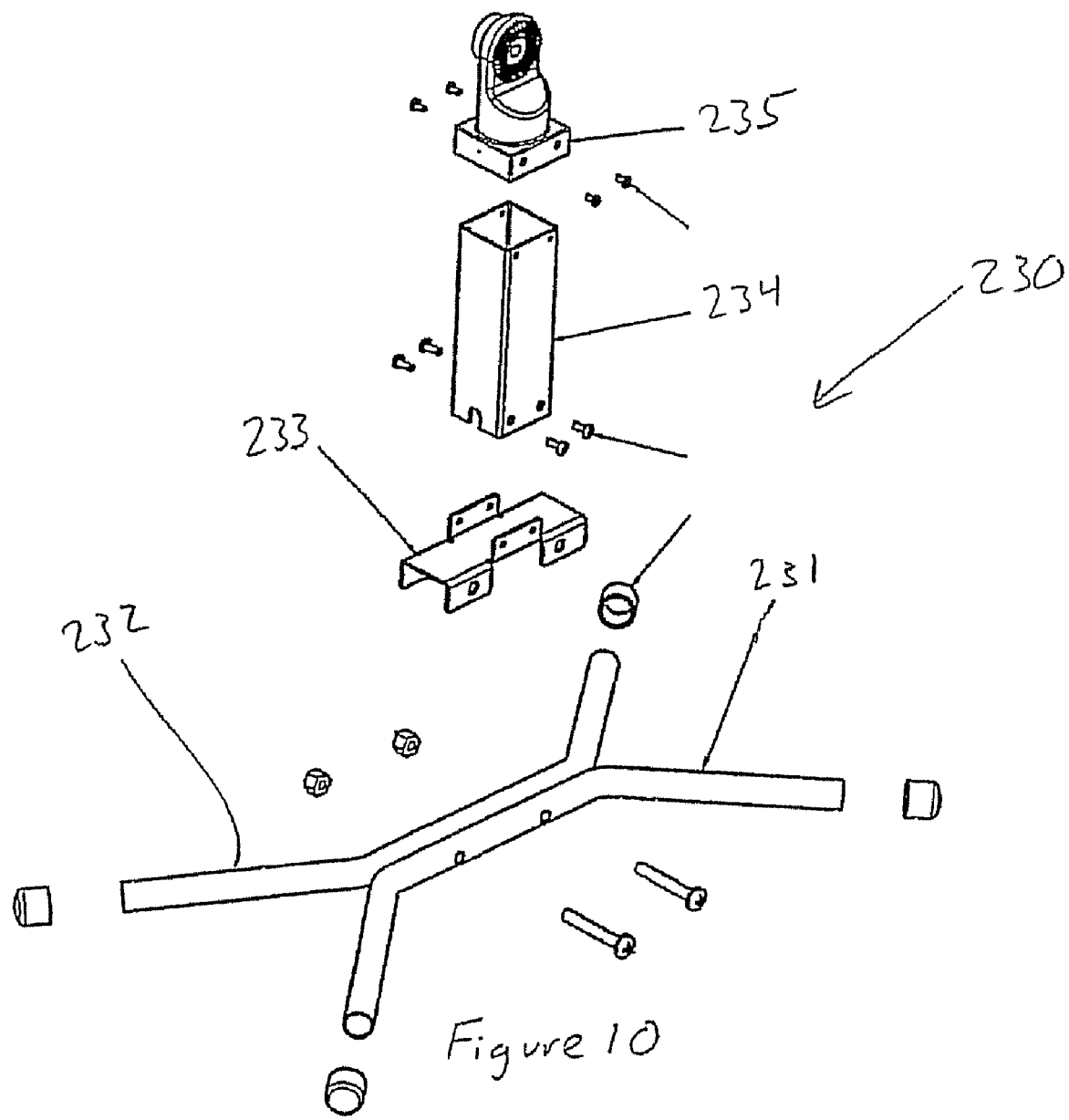
FIG. 10 is an exploded view of the projector support assembly member of the alternate embodiment of FIG. 9.

Referring to FIG. 10, one embodiment of a stand 230 is shown which includes two similarly shaped tubular members 231 and 232. The tubular members 231 and 232 may be bent into a V-shape with a flat bottom. To form the stand 230, the tubular members 231 and 232 may be abutted and screwed together. This forms a stand 230 with a double-wide central portion and four flared ends having the width of a single tube. The stand 230 may also include a bracket 233, vertical chamber 234 and adapter 235. The bracket 233 is attachable to both the tubular members 231 and 232 as well as the vertical chamber 234. The vertical chamber 234 is preferably hollow and may hold a transformer. The adapter 235 is attachable to the vertical chamber 234 on one end and either the support member 296 or a projector 260 if used alone, on its opposite end. For outdoor use, one or more J-shaped stakes may be used to hold the stand in place. The longer portion of the J-shaped stake enters the ground while the shorter portion hooks one of the tubular members 231.

Figure 18:
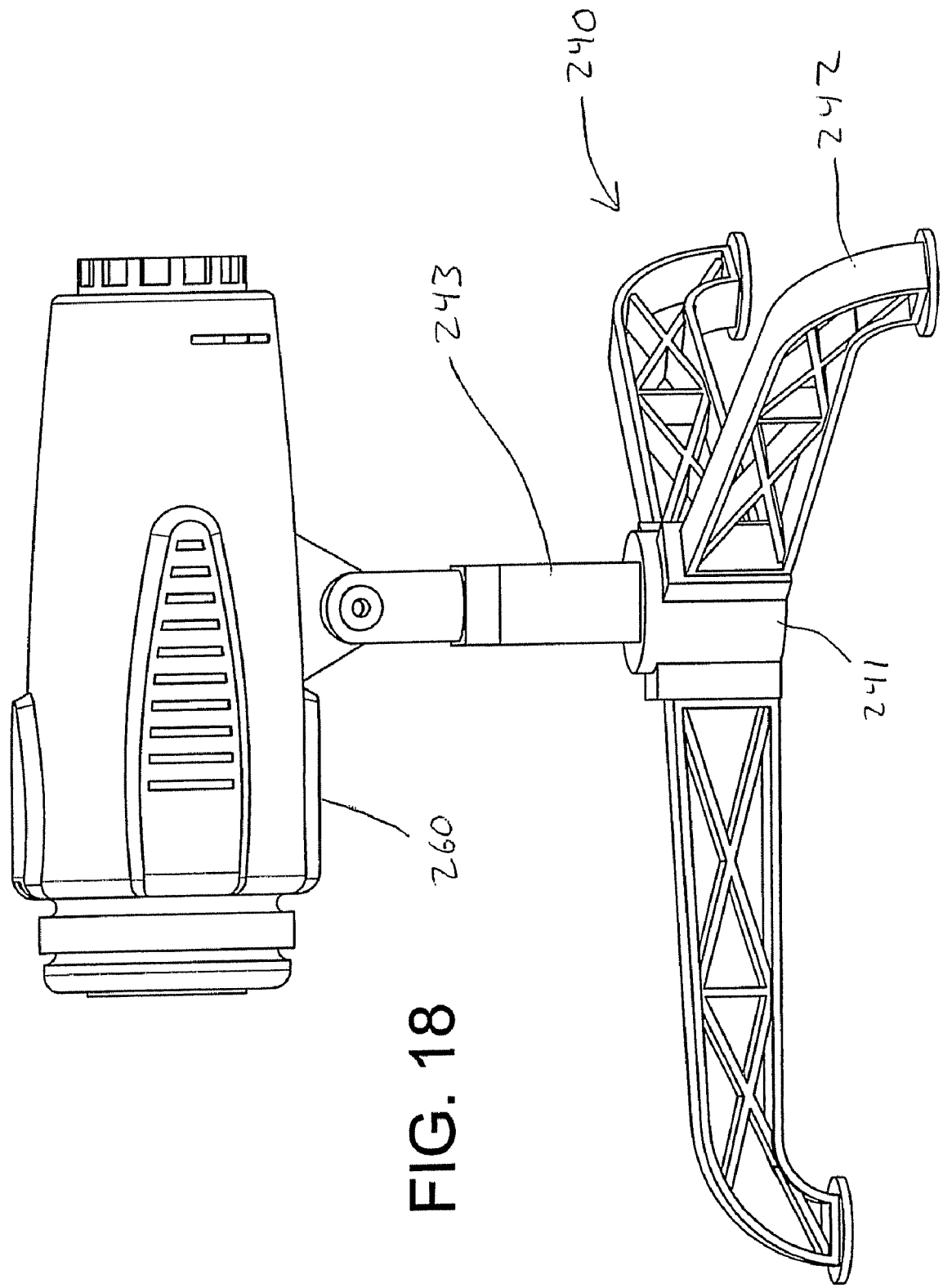
FIG. 18 is a side view of a projector using an alternate embodiment of a support member.
Figure 19:
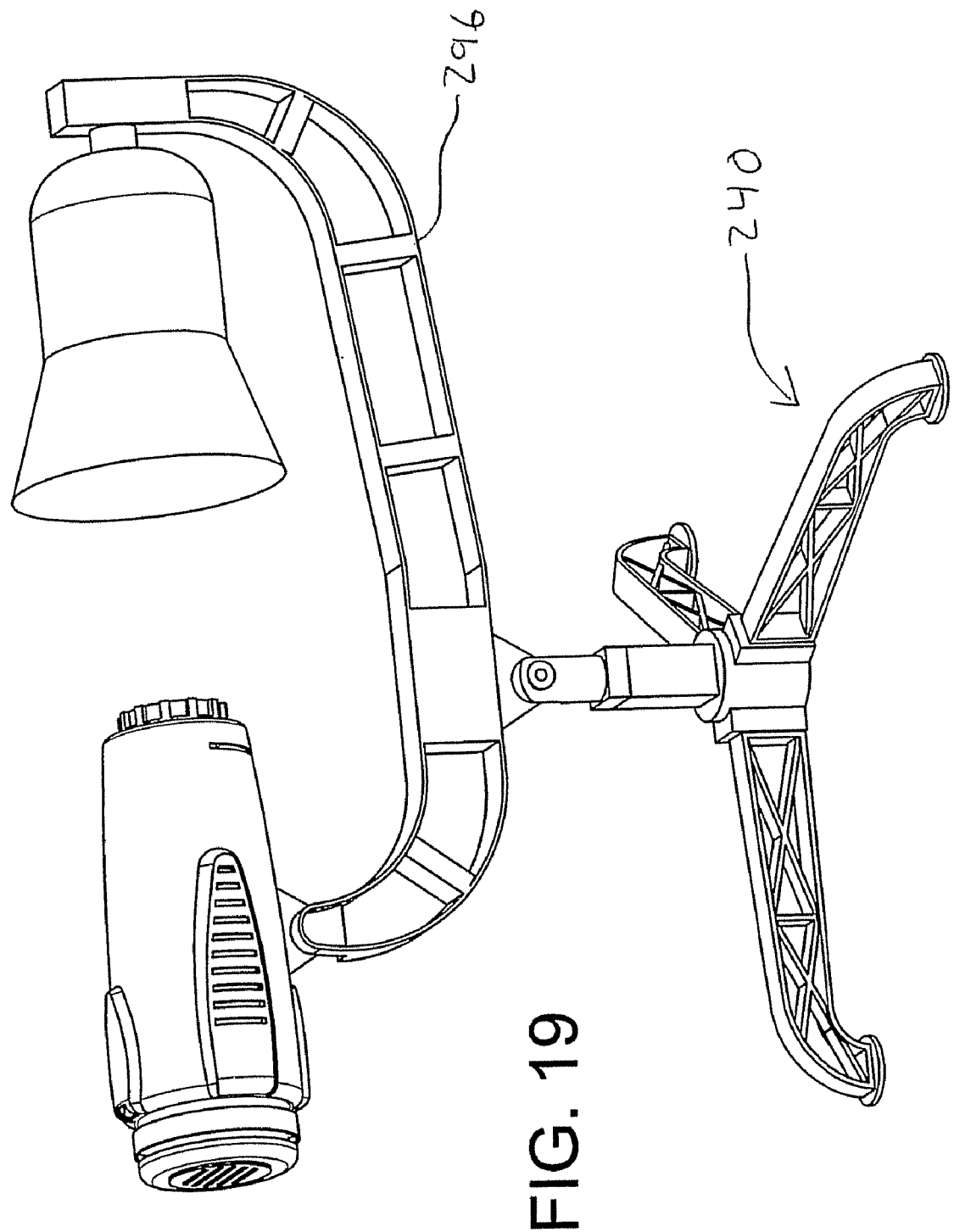
FIG. 19 is a side view of a projector and mirror ball assembly using an alternate embodiment of a support member.
Figure 20:
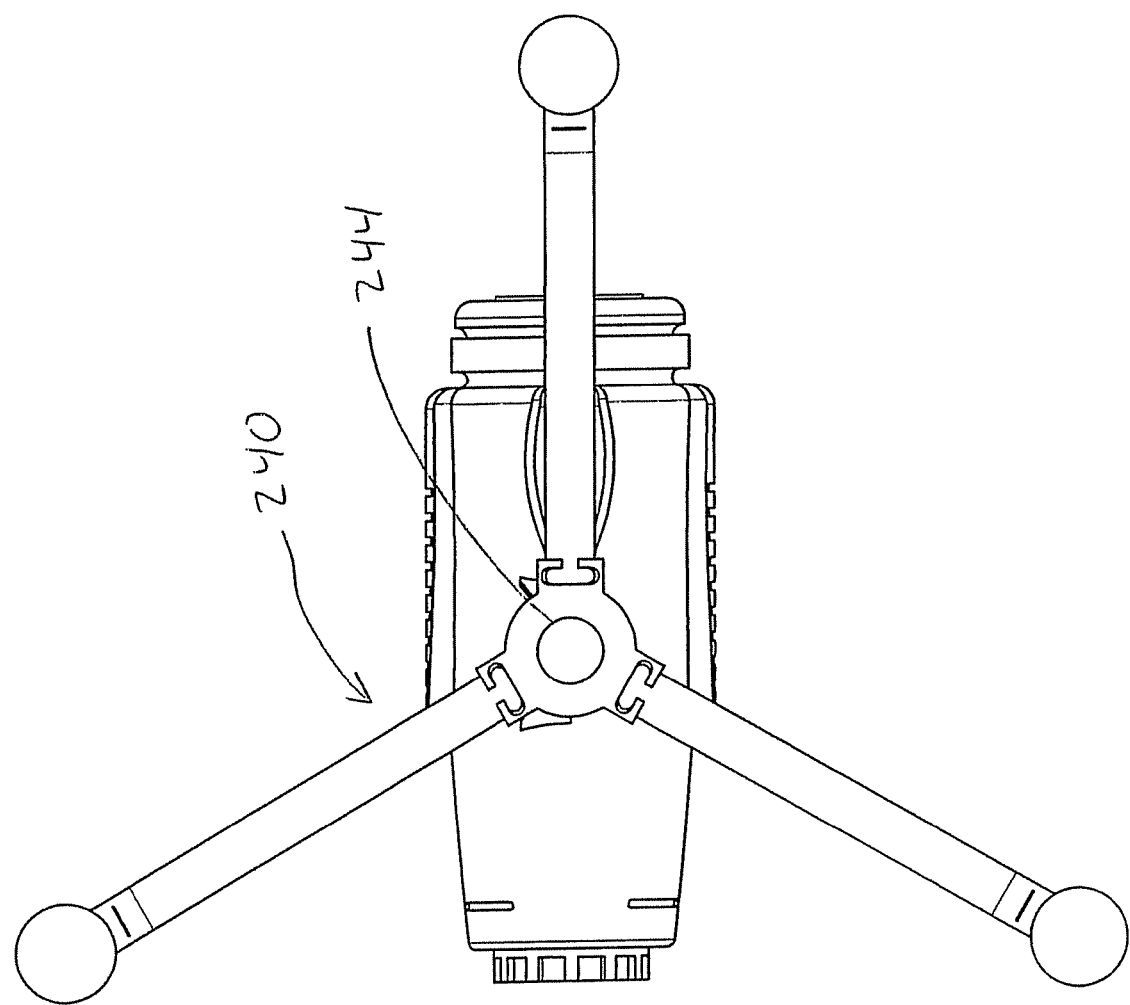
FIG. 20 is a bottom view of the alternate embodiment of a support member.
Figure 21:
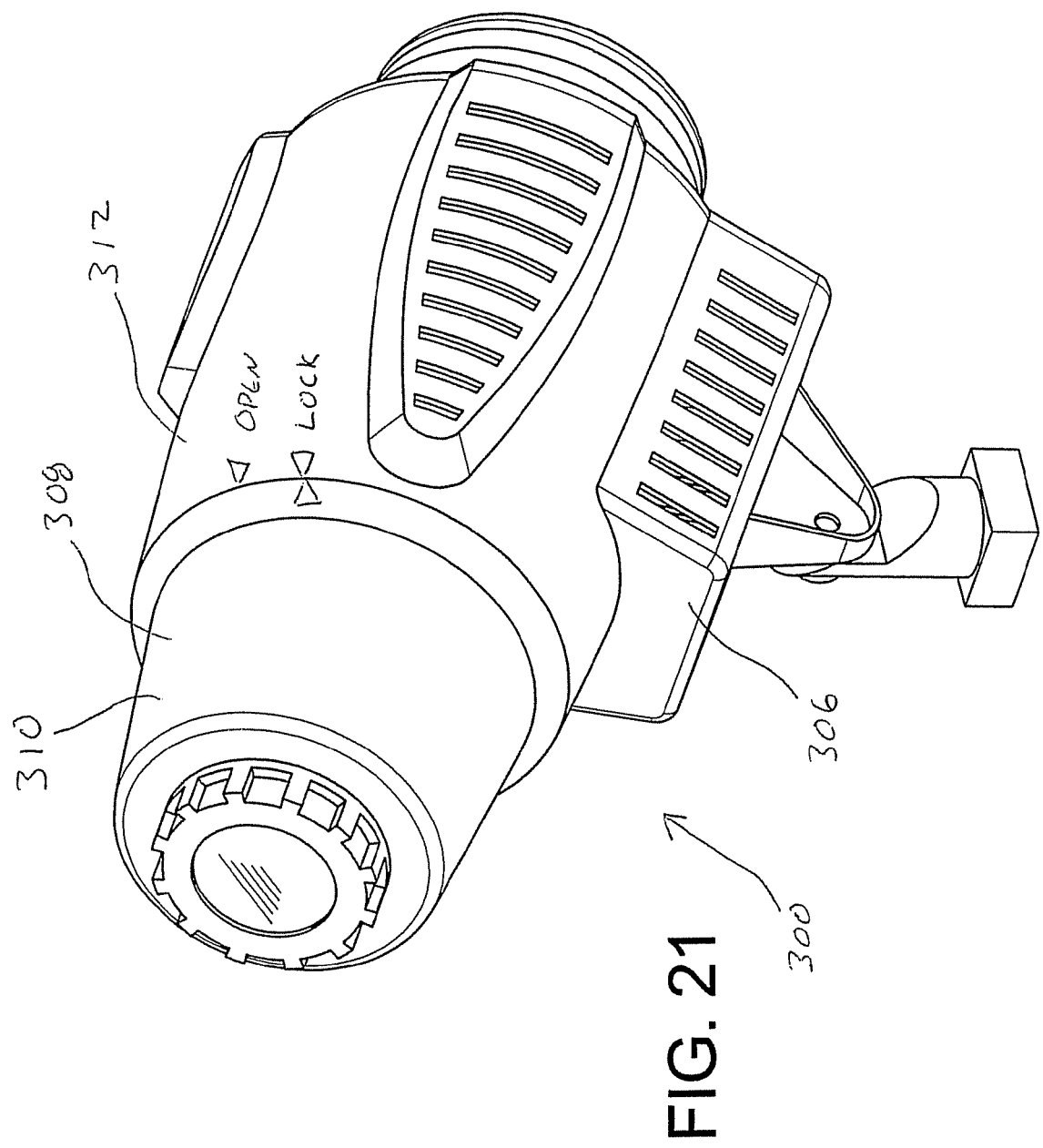
FIG. 21 is a perspective view of another embodiment of the projector having two image sources.
Figure 22:
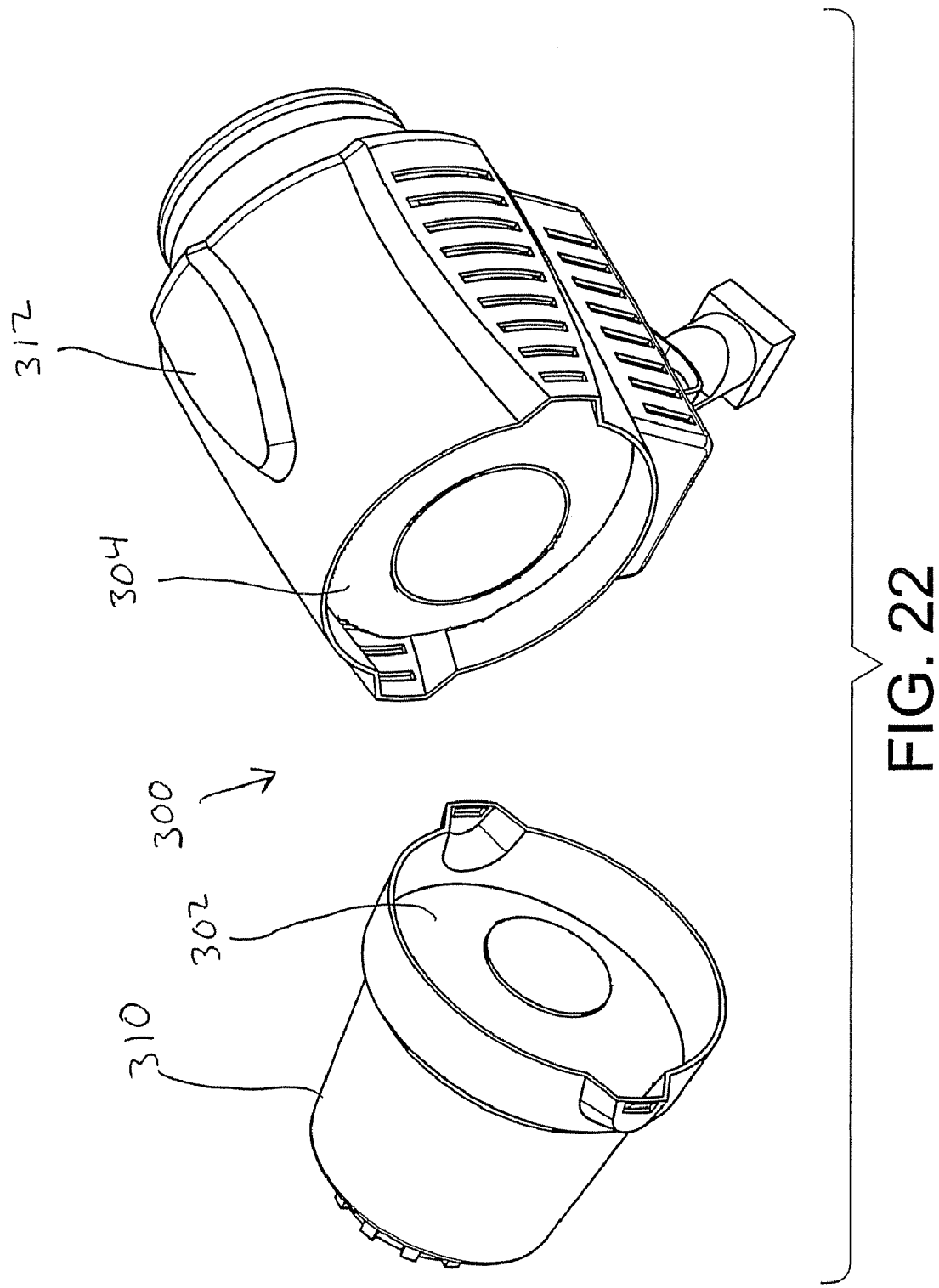
FIG. 22 is an exploded view of the projector of FIG. 21.
Figure 23:
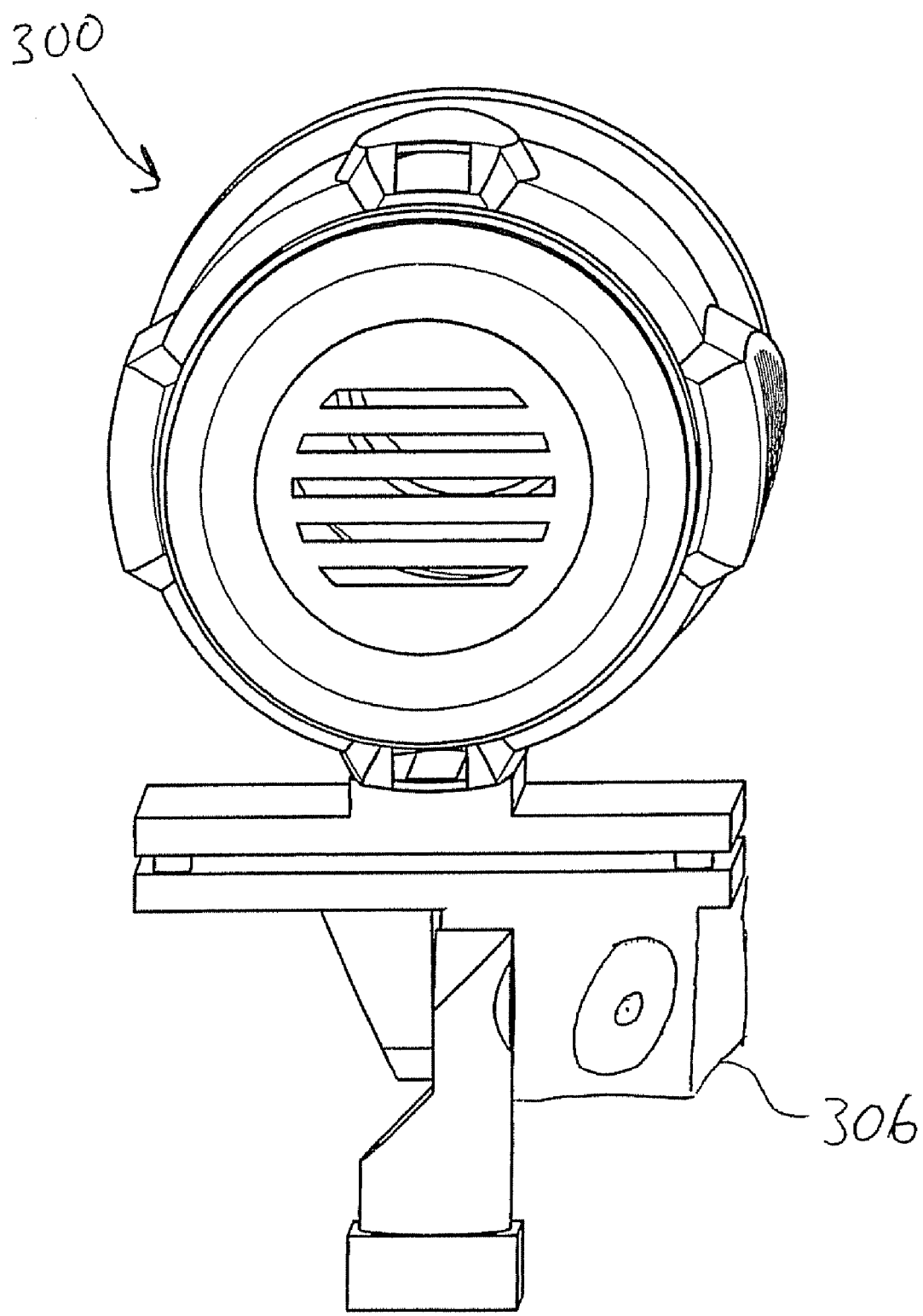
FIG. 23 is a rear view of the projector of FIG. 21.
Figure 24:
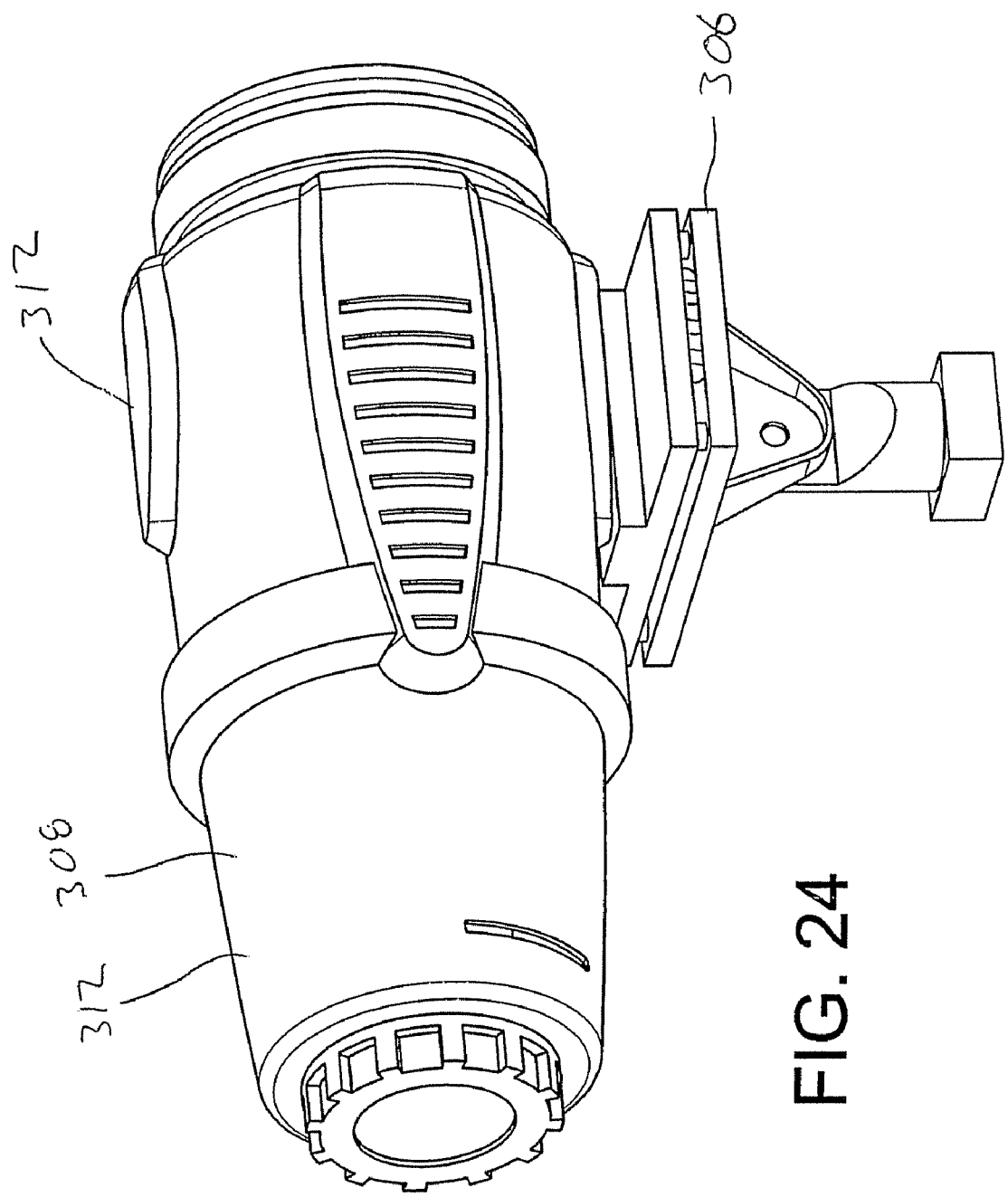
FIG. 24 is an alternate perspectivel view of the projector of FIG. 21.

FIGS. 18-20 show an alternative embodiment 240 of a stand. The stand 240 may be used to support either a projector 260 by itself or a projector and reflective element assembly. The stand includes a central hub 241, a number of legs 242 and a vertical chamber 243. A transformer may be held within the central hub 241, vertical chamber 243 or extend through both. The legs 242 extend outward from the hub 241 and may be detachable. In a preferred embodiment, the legs 242 have about equal lengths and are spaced about equally around the hub 241. The frame 240 may also include a stop ring 244 as an additional support, the ring making contact with the floor or ground under the stand. The stand 240 is preferably made from plastic.

FIGS. 14-17 show a reflector element 208 embodiment which may be driven from its inside. The reflector element includes a housing 270 which is preferably made in two separate portions which may be joined together. The housing 270 may be any shape, but preferably is spherical or barrel shaped. The housing 270 may include or support a plurality of reflective members. These members may be small mirror pieces which are attached to the surface of the housing 270. Alternatively, the housing 270 itself, may be formed from a reflective material and contoured. Alternatively, a reflective coating may be applied to the exterior surface of the housing 270. The interior surface of one or both portions of the housing 270 may include teeth 279 which are used to drive the housing 270. The teeth 279 may be affixed to or molded into the housing 270. The reflector element 208 also includes one or more holder and spindle assemblies 271 and 272. These assemblies may hold one or more components in a stationary position while the housing 270 is moving. The spindle portion of the assembly 271 and 272 can project through the housing 270. A bearing 273 may be placed between the stationary spindle and the moving housing 270. The holder and spindle assemblies 271 and 272 may support an electric motor 274 and a plurality of gears 275. As shown schematically in FIG. 16, the rotation of the motor 274 turns a gear which turns a second gear, which can turn any number of additional gears, which in turn rotate the housing 270. The gears may be sized to provide a desired speed and torque.

In another embodiment of the projector including the reflector element, the projector may only project light. The image source is omitted. As a result specs of light are reflected from the reflector element to the viewing surface.

FIGS. 21-24 show another embodiment of the projector which includes multiple image sources. The projector 300 includes a first image support assembly 302 and a second image support assembly 304. The first image support assembly 302 is stationary and the second image support assembly 304 may be rotated by a drive mechanism 306 located below the lens tube 308 of the projector 300. The drive mechanism 306 may include one or more gears which translate the motion of an electric drive motor into motion to rotate the image support assembly 304. In a preferred embodiment, the image supported in the first image support assembly 302 is an easily defined shape or character while the image in the second image support assembly is an enhancing effect image such a series of slits, alternating clear and foggy patches, or alternating color sections. The rotation of the second image support assembly causes the effect on the stationary image to change in an interesting way. The projector 300 of the embodiment of FIGS. 21-24 may be made from two interlocking portions 310 and 312 having similar lengths. The portions 310 and 312 may be easily attached and detached using a bayonet type attachment mechanism. Upon separation the image support assemblies 302 and 304 are oriented adjacent the opening, thus allowing easy removal and change of the image source.

FIG. 25 shows a display mechanism 400 which may be placed in a yard or other location when any of the projector embodiments are used outdoor. The display mechanism includes a screen 402 upon which an image may be directly displayed or upon which reflected images may be displayed. The screen is supported by two poles 404 held in place by a number of tethers 406. The screen my be made of cloth or plastic and may be generally solid or perforated in order to provide less wind resistance. Other alterations and modifications of the invention will likewise become apparent to those of ordinary skill in the art upon reading the present disclosure, and it intended that the scope of the invention disclosed herein be limited only by the broadest interpretation of the appended claims to which the inventors are legally entitled:

The invention claimed is:

1. A projector comprising:
    a directional light source, a lens disposed opposite the light source, and an image medium support assembly disposed between the light source and the lens along a light path that extends from the light source through the lens, wherein the image medium support assembly is adapted to support and rotate at least one image medium around an axis that is parallel to the light path such that each of a plurality of images formed in the image medium passes though the light path when the image medium is rotated;
    a housing enclosing the directional light source, the image medium support assembly, and the lens; and
    a support member having a tubular top portion connected to an underside of the housing such that the projector may vary inclination about the tubular top portion to adjust the angle of projection;
    wherein the tubular top portion of the support member terminates at either a stand portion or a stake portion.

2. The projector of claim 1 wherein the image medium support assembly further comprises an electric motor having a rotatable shaft and the image medium has arcuately spaced images, the image medium being rotatable by a drive assembly connected to the rotatable shaft to serially advance the images.

3. The projector of claim 1 wherein said housing is suitable for outdoor use.

4. The projector of claim 3 wherein said housing is a polymeric material.

5. The projector of claim 1, wherein the lens is biconvex.

6. The projector of claim 1, wherein the image medium is a light transmitting plastic disk.

7. The projector of claim 1 wherein the image medium is a light transmitting plastic disk.

8. A projector comprising:
   a directional light source, a lens disposed opposite the light source, and an image medium support assembly disposed between the light source and the lens along a light path that extends from the light source through the lens;
   a housing enclosing the directional light source, the image medium support assembly, and the lens, wherein said housing is suitable for outdoor use; and
   a support member having a tubular top portion connected to an underside of the housing such that the projector may vary inclination about the tubular top portion to adjust the angle of projection;
   wherein the tubular top portion of the support member terminates at either a stand portion or a stake portion.

9. The projector of claim 8, wherein said image medium support assembly is adapted to support and rotate at least one image medium around an axis that is parallel to the light path such that each of a plurality of images formed in the image medium passes through the light path when the image medium is rotated.

10. The projector of claim 9 wherein the image medium support assembly further comprises an electric motor having a rotatable shaft and the image medium has arcuately spaced images, the image medium being rotatable by a drive assembly connected to the rotatable shaft to serially advance the images.

11. The projector of claim 8 wherein said housing is a polymeric material.

12. The projector of claim 8 wherein the lens is biconvex.

13. The projector of claim 8 wherein the image medium is a light transmitting film.

14. The projector of claim 8 wherein the image medium is a light transmitting plastic disk.

* * * * *